United States Patent [19]
Ma

[11] 3,908,520
[45] Sept. 30, 1975

[54] ADJUSTMENT MEANS FOR DOUBLE DIAPHRAGM SPRING BRAKE CHAMBER ACTUATOR

[75] Inventor: James W. Ma, Northfield, Ill.

[73] Assignee: The Berg Manufacturing Company, Des Plaines, Ill.

[22] Filed: Oct. 25, 1973

[21] Appl. No.: 409,633

[52] U.S. Cl. .............................. 92/94; 92/63; 92/64; 92/99
[51] Int. Cl.² ... F15B 21/02; F01B 19/00; F16J 3/00
[58] Field of Search ............... 92/63, 62, 64, 94, 99

[56] References Cited
UNITED STATES PATENTS

| | | | |
|---|---|---|---|
| 3,107,583 | 10/1963 | Woodward | 92/63 |
| 3,176,870 | 4/1965 | Cruse | 92/63 |
| 3,331,291 | 7/1967 | Rumsey | 92/63 |
| 3,359,869 | 12/1967 | Avrea | 92/63 |
| 3,406,609 | 10/1968 | Cox, Jr. | 92/63 |
| 3,439,585 | 4/1969 | Herrera | 92/63 |
| 3,479,927 | 11/1969 | Woodward | 92/64 |
| 3,502,003 | 3/1970 | Dobrikin et al. | 92/63 |
| 3,796,138 | 3/1974 | Doyle et al. | 92/63 |
| 3,811,365 | 5/1974 | Gordon | 92/63 |

*Primary Examiner*—Paul E. Maslousky
*Attorney, Agent, or Firm*—Neuman, Williams, Anderson & Olson

[57] ABSTRACT

A release mechanism for a double diaphragm spring brake actuator utilizes a threaded rod having a portion extending outwardly from the brake chamber housing and a portion telescopically positioned within a movable piston in the emergency brake chamber. The threaded rod may have the exterior portion covered by a removable cup. The piston within the emergency brake chamber is free to move the entire length of the release bolt, but yet only a portion of the release bolt extends outwardly from the brake chamber housing.

2 Claims, 1 Drawing Figure

U.S. Patent  Sept. 30, 1975  3,908,520
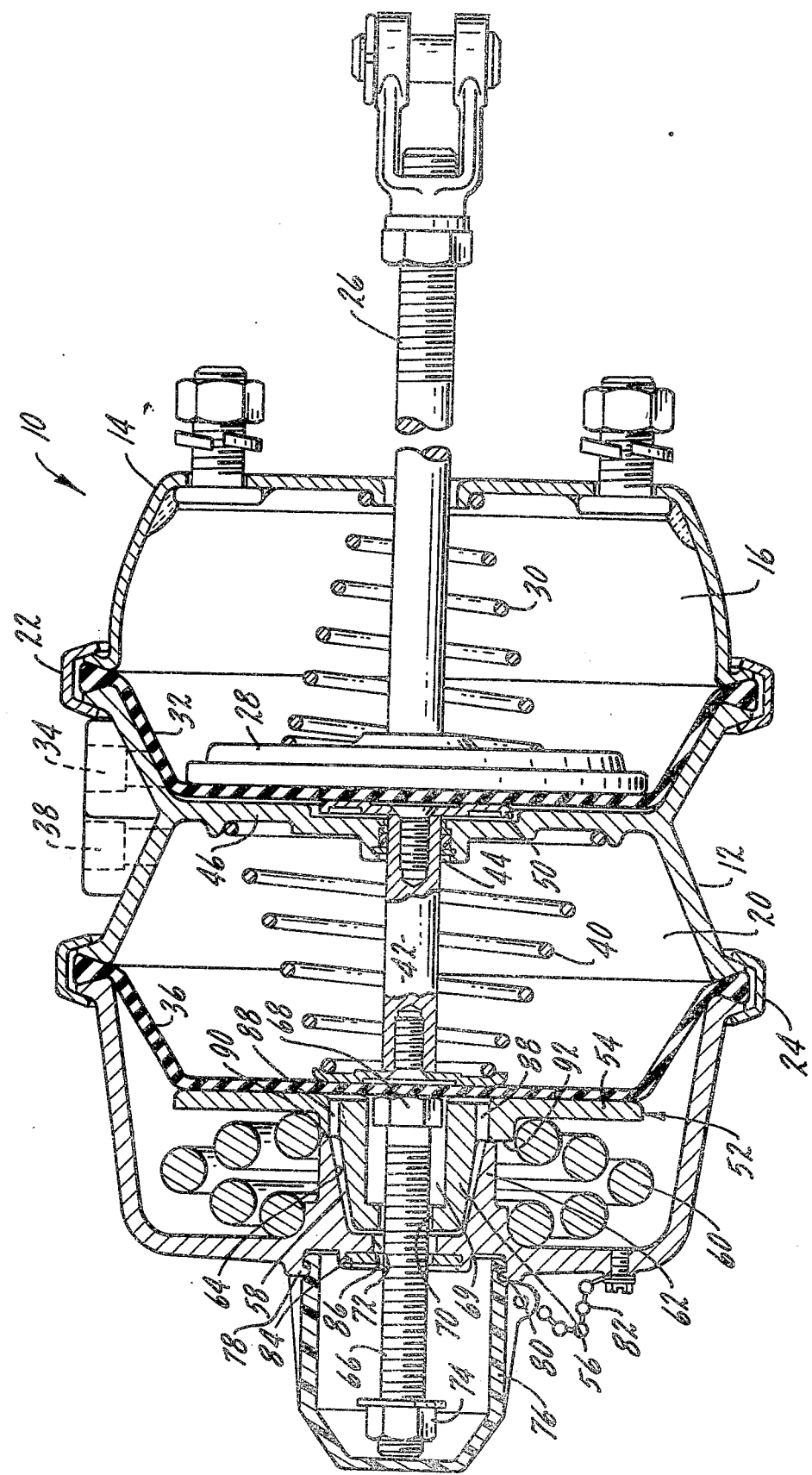

ADJUSTMENT MEANS FOR DOUBLE DIAPHRAGM SPRING BRAKE CHAMBER ACTUATOR

SUMMARY OF THE INVENTION

The present invention relates to spring brake actuators and in particular to an improved release mechanism for the emergency brake chamber spring.

A primary purpose of the invention is a brake construction of the type described in which a portion of the release bolt is positioned within the emergency chamber housing and a portion is positioned without.

Another purpose is an improved brake chamber construction of the type described in which the piston within the emergency brake chamber can travel the full length of thee release bolt, but only a portion of the release bolt extends outside of the chamber housing.

Other purposes will appear in the ensuing specification, drawing and claims.

BRIEF DESCRIPTION OF THE DRAWING

The invention is illustrated diagrammatically in the attached cross section illustrating a brake chamber of the type described.

DESCRIPTION OF THE PREFERRED EMBODIMENT

In prior double diaphragm spring brake chamber actuators there are basically two types of release mechanisms. In one, the release bolt is independently positioned on the brake chamber housing and must be removed from the housing and applied at the release port to effect release of the brakes. In another, the entire length of the release bolt extends outside of the brake chamber housing. The former construction has the disadvantage in that often the release bolt can become lost, whereas, the latter has the disadvantage that the effective length of the brake chamber is extended and the release bolt can at times become damaged.

The present invention provides a release bolt which is permanently attached to the brake chamber housing, but yet does not extend outside of the chamber housing by its full length.

The brake assembly has a housing indicated generally at 10 which may be formed of three parts or castings, a central portion 12, an end portion 14 cooperating with the portion 12 to define the brake service chamber 16, and an end portion 18 cooperating with the central portion 12 to define an emergency chamber 20. A ring 22 clamps portion 14 to the central portion 12 and a ring 24 clamps portion 18 to the central portion 12.

Extending outwardly from the service chamber 16 is a brake actuating rod 26 carrying a plate 28 which is positioned within the service chamber 16. A coil spring 30 normally biases the plate 28 and the diaphragm 32 to the left, as shown in the drawing. The rubber diaphragm 32 preferably is peripherally attached between the housing portion 14 and housing portion 12 and held in this position by the ring 22. In normal operation, air pressure applied through a port 34 to the left side of the diaphragm 32 will effect operation of brake actuator rod 26 to apply the brakes.

A second diaphragm 36 is similarly held between housing portion 12 and housing portion 18 by ring 24. An air pressure port 38 is in communication with the interior of emergency brake chamber 20 on the right side of diaphragm 36. Normally coil spring 40, positioned about a rod 42 within the emergency brake chamber 20, in cooperation with air pressure applied through port 38, maintains the diaphragm in the position shown. In this connection, port 38 is connected to the emergency supply and port 34 is connected to the service supply. Rod 42 extends through a passage 44 in an interior wall 46 of housing portion 12 and is attached to a plate 50 which abuts service chamber diaphragm 32. Thus, when there is emergency brake pressure in the system, diaphragm 36 is maintained in the inoperable position shown so that there is no brake actuating force applied by rod 42 to brake actuating rod 26.

On the left side of diaphragm 36 is a piston, indicated generally at 52, and having an annular flat portion 54 which abuts diaphragm 36. Piston 52 has a hub 56, the outer surface of which is tapered or conical, as indicated at 58. A barrel-shaped spring 60 is positioned between the piston plate 54 and the far left end of housing portion 18. Spring 60 is effective to apply brake actuating pressure at such time as there is a drop in the emergency pressure applied to port 38.

Housing portion 18 has an inwardly-directed projection 62, having a conical inner surface 64 which receives the hub 56 of the piston 52. A release bolt 66 has an interior head 68 positioned within a hexagonal cavity 69 of the hub 56 of piston 52, with the shank of the bolt passing through a hub passage 70 and a passage 72 formed in housing portion 18. The exterior of release bolt 66 may threadedly mount a release nut 74. The nut is normally positioned outside of the brake actuator. A cup 76 encloses that portion of the release bolt 66 extending outside of the brake actuator and the nut 74 and may be releasably held by an inwardly-extending lip 78 on the exterior of the housing portion 18 which fits within a groove 80 formed on the cup. The cup may be formed of a suitable plastic, if desired. A chain or the like 82 may be used to permanently attach the cup to the brake actuator housing. A washer 84 is positioned against the exterior housing portion 18, in alignment with passage 72, and itself has a passage 86 of a size to prevent movement of the nut 74 into the brake actuator housing.

The piston 52 may have vent passages 88 which are in communication with the exterior of the brake actuator through passage 72 and the interior passage 86 of washer 84. The inward projection 62 of housing portion 18 may have an annular lip 90 which is in contact with an annular rib surface 92 of piston 52 when spring 60 is fully compressed. The dimensions of the projection 62 are such that when the lip 90 is in contact with the annular rib surface 92, with the axes of hub 56 and the projection 62 colinear, the projection 62 engages no part of the hub 56; thus, an unobstructed air passage is maintained about the entire surface of the hub. This air passage is effective to connect the vent passages 88 with the passages 72 and 86.

In operation, as is well known in the art, service pressure applied at port 34 is effective to move diaphragm 32 to the right, causing operation of the brakes. Normally, emergency pressure is applied at port 38 to retain diaphragm 36 and spring 60 in the position shown in the drawing. When there is a drop in pressure at emergency port 38, spring 60 forces diaphragm 36 to the right, and through rod 42 causes operation of the brake rod 26.

After the brakes have been applied in the emergency manner described above, it is at times necessary to release the brakes so that the vehicle may be moved. When the truck operator desires to release the brakes, he first removes cup 76 to expose the release bolt. Nut 74 is then turned on rod 66 in such a manner as to pull piston 52 to the left, compressing spring 60. Once the brakes have been released, the vehicle can then be moved. Nut 74 is a conventional size and shape to be operated by a normal wrench, requiring no special tools. The rod 66 is permanently a part of the brake actuator and does not have to be specially applied to release the brakes.

Of importance is the fact that the piston 52 may move, when the emergency brakes are applied, the entire length of rod 66. During the initial travel to the right of piston 52, rod 66 will move to the right, with piston 52 and diaphragm 36. At such time as nut 74 bottoms upon washer 84, rod 66 will no longer move to the right. However, piston 52 will continue to travel to the right until such time as the head 68 of threaded rod 66 contacts hub 56 adjacent passage 70. Thus, a portion of the release rod is positioned outside of the brake actuator and a portion within, with the permitted travel of piston 52 being generally equal to the interior and exterior portions of threaded rod 66.

Whereas the preferred form of the invention has been shown and described herein, it should be realized that there may be many modifications, substitutions and alterations thereto.

The embodiments of the invention in which an exclusive property or privilege is claimed are defined as followed.

1. In a brake mechanism, a housing having side walls and having a rear wall with a substantially planar exterior surface, a diaphragm positioned within and peripherally held by said housing, air pressure inlet means in said housing communicating with one side of said diaphragm, a piston positioned in said housing on the opposite side of said diaphragm said piston being of suitable dimensions for reciprocating motion within said housing without engaging said side walls and having a generally conical, hollow hub extending away from said diaphragm, said piston including an annular rib disposed at the base of said hub, said housing having an inwardly-directed projection including a generally conical inner surface for receiving said hub, said projection extending inwardly of said housing from said rear wall a distance approximating the extension of said hub from said piston with the axial depth of said conical inner surface being greater than the extension of said hub beyond said annular rib, said projection being of such other dimensions as to engage said annular rib without engaging any part of said hub when said hub is received within said projection and the axes of said conical hub and said conical inner surface are colinear, whereby an unobstructed air passage about the entire surface of said hub within said projection is provided, spring means in said housing for normally urging said piston and diaphragm in a brake operating direction, limiting means for limiting the travel of said piston in said brake operating direction in response to said spring means including a threaded rod, said threaded rod including threads along substantially its entire length and having a portion extending outwardly from said housing and a portion telescopically arranged within said hollow piston hub through a passage in said hub along an axis generally aligned with said brake operating direction, said passage in said hub being suitable for sliding motion of said rod therethrough, said threaded rod extending outwardly of said housing through a passage in said housing suitable for permitting sliding motion of said threaded rod therethrough, and said limiting means further including first means at one end of said rod within said hub and second means disposed along the length of said rod beyond the outer wall of said housing for limiting the piston travel to be generally equal to or less than the outwardly-extending and telescopically arranged threaded rod portions between said first and second means, said first means being effective to prevent complete removal of said rod from said hub and cooperatively operating with the inner surface of said hub to prevent rotation of said threaded rod, said second means being of dimensions sufficient to prevent its movement through said passage in said housing such that said second means cooperatively operates with said threaded rod and said first means to change the limit of travel of said piston when said second means is manually rotated, said hub extending from said piston substantially less than the maximum travel of said piston such that said threaded rod extends substantially beyond said housing when said spring means is compressed, whereby said second means is maintained substantially in the plane of said exterior surface of said housing or outwardly of that plane at all positions of said piston, and cap means of dimensions sufficient to accommodate the maximum extension of said threaded rod beyond said exterior surface, and mounting means on said exterior surface for removably mounting said cap over said extending threaded rod portion.

2. The structure of claim 1 wherein said piston includes passages in the vicinity of said hub for permitting transferral of air therethrough into said unobstructed air passage.

* * * * *